United States Patent [19]

Potash et al.

[11] Patent Number: 4,463,423
[45] Date of Patent: Jul. 31, 1984

[54] METHOD OF TRANSFORMING HIGH LEVEL LANGUAGE STATEMENTS INTO MULTIPLE LOWER LEVEL LANGUAGE INSTRUCTION SETS

[75] Inventors: Hanan Potash, La Jolla; Howard H. Green, San Diego, both of Calif.

[73] Assignee: Burroughs Corporation, Detroit, Mich.

[21] Appl. No.: 398,194

[22] Filed: Jul. 14, 1982

[51] Int. Cl.$^3$ .............................................. G06F 9/00
[52] U.S. Cl. ................................... 364/300; 364/200
[58] Field of Search ................. 364/200 MS File, 300

[56] References Cited
U.S. PATENT DOCUMENTS

4,430,708  2/1984  Isaman ............................... 364/200

Primary Examiner—Raulfe B. Zache
Attorney, Agent, or Firm—Charles J. Fassbender; Kevin R. Peterson

[57] ABSTRACT

Disclosed is a method of transforming an assignment statement of a high level programming language, such as ALGOL and COBOL, into first, second, and third sets of lower level object language instructions wherein instructions of the first set are executable in an interleaved fashion with instructions of the second and third sets, the latter two of which are executable at the same time. When the instructions of the first, second, and third sets are executed in the above-recited fashion, a substantial improvement in the execution time of the corresponding assignment statement is attained.

14 Claims, 9 Drawing Figures

| | | |
|---|---|---|
| t29 | Z45 | RTN |
| t30 | X2 | Fetch F( ) |
| t31 | X2 | F( )−R2→R2 |
| t32 | X3 | RTN, RCV from $P_X$ |
| t33 | X3 | Fetch E |
| t34 | X3 | E−5→R3 |
| t35 | X4 | RTN, RCV from $P_X$ |
| t36 | X4 | R1+R2→R1 |
| t37 | X5 | RTN, RCV from $P_X$ |
| t38 | X5 | R1+R3→R1 |
| t39 | X5 | STORE R1 @ A |
| t40 | | RTN |

METHOD OF TRANSFORMING HIGH LEVEL LANGUAGE STATEMENTS INTO MULTIPLE LOWER LEVEL LANGUAGE INSTRUCTION SETS

BACKGROUND OF THE INVENTION

This invention relates to computer-implemented methods of transforming assignment statements of a relatively high level source language into relatively low level object language instructions; and it relates to digital computers for executing the low level object language instructions.

Figure 1:
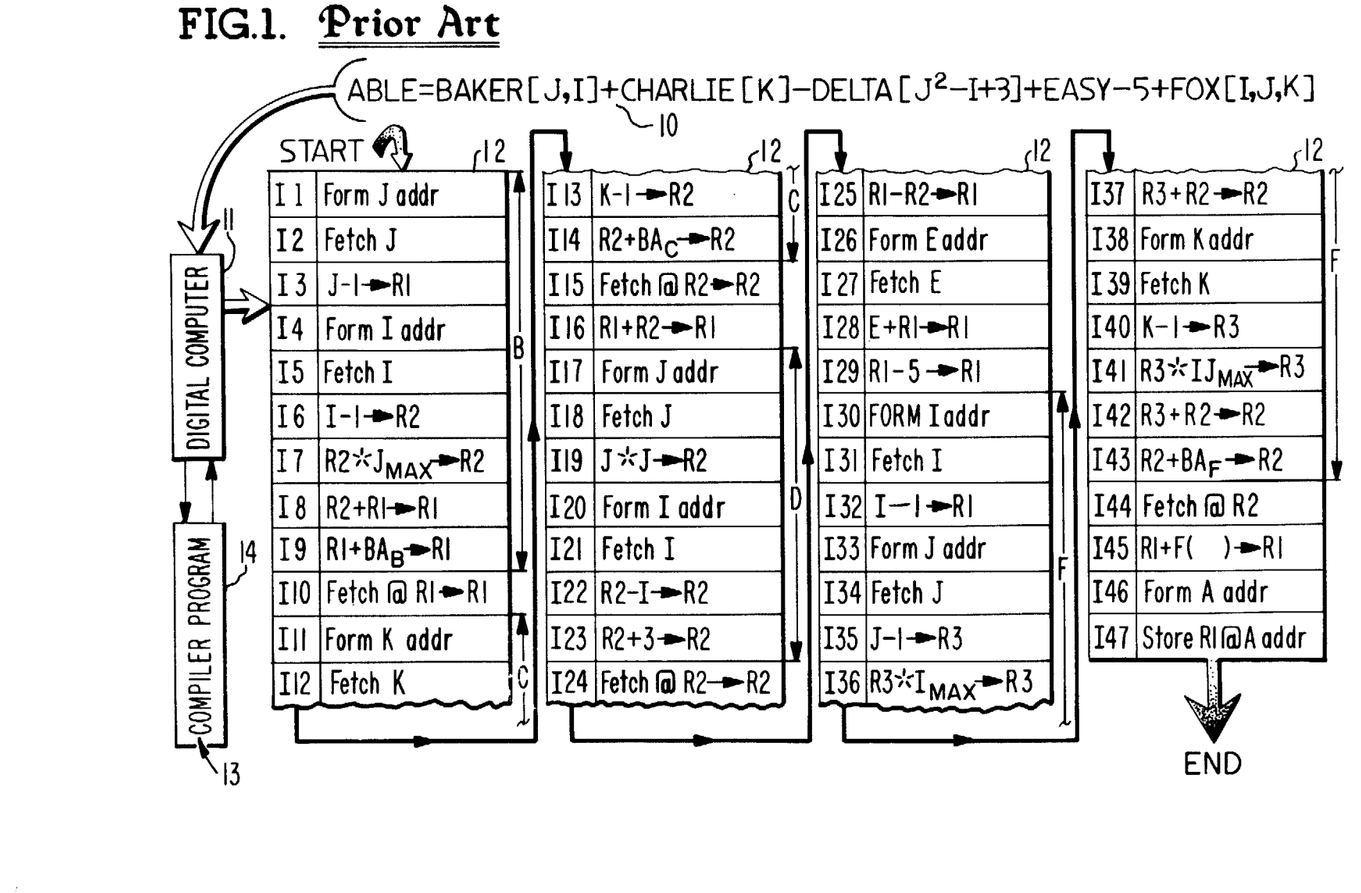
FIG. 1 is a diagram illustrating the transformation of a relatively high level language source statement into relatively low level language instructions as such transformation is carried out by a prior art compilation process.

One prior art method of transforming a high level source language assignment statement into low level object language instructions is illustrated schematically in FIG. 1. There, reference numeral 10 indicates the assignment statement that is to be transformed; reference numeral 11 indicates the digital computer which receives and transforms statement 10; reference numeral 12 indicates the set of low level object language instructions into which statement 10 is transformed; and reference numerals I1–I47 indicate the individual instructions in set 12.

Assignment statements, such as statement 10, are part of high level languages called FORTRAN, ALGOL, PASCAL, COBOL, C, PL1, and PL/M-80. They are written by an individual called a programmer, and they provide the means by which the programmer specifies the operations that he desires the computer to perform.

A characteristic feature of assignment statements is that they assign a value to a variable; and the assigned value is expressed as a mathematical function of one or more other variables and/or constants. In statement 10, for example, the variable ABLE is assigned a value that is expressed as: $BAKER(J,I) + CHARLIE(K) - DELTA(J^2 + I + 3) + EASY - 5 + FOX(I,J,K)$ where BAKER, CHARLIE, DELTA, EASY, and FOX also are variables.

Digital computers generally do not execute assignment statements directly because their format is too complex. Instead, assignment statements are transformed prior to their execution into lower level object language instructions having a simpler format. This transformation is performed by a computer-implemented process under the direction of program called a compiler.

In FIG. 1, the compiler program is indicated by reference numeral 13. Compiler program 13 is stored in a memory 14; and it directs computer 11 to carry out all of the steps by which the high level language statements are transformed into the low level language instructions.

One of the tasks of compiler 13 is to provide memory addresses for each of the variables in the assignment statement. In FIG. 1, for example, instructions I1–I9 compute the address of BAKER(J,I); instructions I11–I14 compute the address of CHARLIE(K); instructions I17–I23 compute the address of DELTA(J$^2$–I+3); and instructions I30–I43 compute the address of FOX(I,J,K).

Variables BAKER, CHARLIE, DELTA, and FOX are all indexed variables. As such, they each represent an N-dimensional matrix where N is the number of indices associated with the variable. BAKER has two indices, J and I, so it represents a two-dimensional matrix; CHARLIE and DELTA have one indice, so they each represent a one-dimensional matrix; and FOX has three indices, I, J, K, so it represents a three-dimensional matrix.

Another task of compiler 13 is to generate low level object language instructions which perform arithmetic operations as specified in statement 10 on the addressed variables. FIG. 1 shows that after variable B is addressed, instruction I10 fetches variable BAKER; and after variable CHARLIE is addressed, instructions I15–I16 add variable CHARLIE to variable BAKER. Similarly, address calculations for the variables DELTA, EASY, and FOX respectively are followed by instructions I24–I25, I27–I29, and I44–I47 which arithmetically combine those variables as specified in statement 10.

A problem, however, with the above-described compiler-generated instructions I1–I47 is that some of the information which is implicitly contained in the original assignment statement 10 is lost by the compilation process. For example, implicit in statement 10 is the fact that the variables BAKER, CHARLIE, DELTA, EASY and FOX can be combined in any order, and the fact that the variables can be combined by parallel suboperations. Yet, neither of these facts is apparent from inspection of the compiled instructions I1–I47. Consequently, the compiled instructions I1–I47 are executed one at a time in a serial fashion, which in turn adversely limits their minimal execution time.

BRIEF SUMMARY OF THE INVENTION

Accordingly, a primary object of the invention is to provide an improved method of transforming high level language statements into lower level language instructions.

Another object of the invention is to provide a method of transforming high level language statements into multiple lower level language instruction sets which are executable at an improved speed.

In the present invention, these and other objects are provided by a digital computer-implemented method which transforms relatively high level source language statements into first, second, and third sets of relatively low level object language instructions; and, the transformations are made such that instructions of the first set are executable in an interleaved fashion with instructions of the second and third sets, the latter two of which are executable at the same time.

This method includes the steps of (a) generating, via the computer, an instruction of the first set which specifies a mathematical operation in the statement being transformed and references two encoded addresses having the same code indicating that the respective addresses are of instructions in the second and third sets; and (b) producing, via the computer, instructions of the second and third sets for respective storage at the encoded addresses which are simultaneously executable to compute respective addresses for two variables in the statement that are modified by the operation specified in the instruction of the first set.

Also, either as an alternative or in combination with the above steps, the method includes the steps of (a) generating, via the computer, an instruction of the first set which specifies a mathematical operation in the statement and references an encoded address having a first code indicating that the address is of a first variable and references another encoded address having a second code indicating that the address is of instructions in the second set; and (b) producing, via the computer, instructions of the second set for storage at the second encoded address which compute the address of the second variable which is combined in the source language statement with the first variable by the operation specified in the instruction of the first set.

BRIEF DESCRIPTION OF THE DRAWINGS

Various features and advantages of the invention will best be understood by reference to the following Detailed Description and accompanying drawings wherein.

DETAILED DESCRIPTION OF THE INVENTION

One preferred method, according to the invention, of transforming high level source language statements into lower level object language instructions will now be described in detail in conjunction with FIG. 2. In this method, all of the steps of the language transformation process are carried out by computer 11 under the direction of a novel compiler program 21 which is stored in a memory 20.

Those steps which compiler program 21 direct computer 11 to perform include the generation of a NAME TABLE, and the generation of three different sets of low level object language instructions. These three sets of object language instructions are identified in FIG. 2 as X-CODE, Y-CODE, and Z-CODE instructions; and they are generated such that the X-CODE instructions are executable in an interleaved fashion with Y-CODE and Z-CODE instructions, the latter two of which are executable at the same time.

To generate the NAME TABLE, respective NAME TABLE ENTRIES (NTE) are generated for each variable in the assignment statement that is to be transformed. Each NAME TABLE ENTRY is in the form of an encoded address. A code of 11 indicates that the address is of instructions which compute the address of the corresponding variable; whereas a code of 00 indicates that the address is of the corresponding variable itself.

Figures 2, 2A:
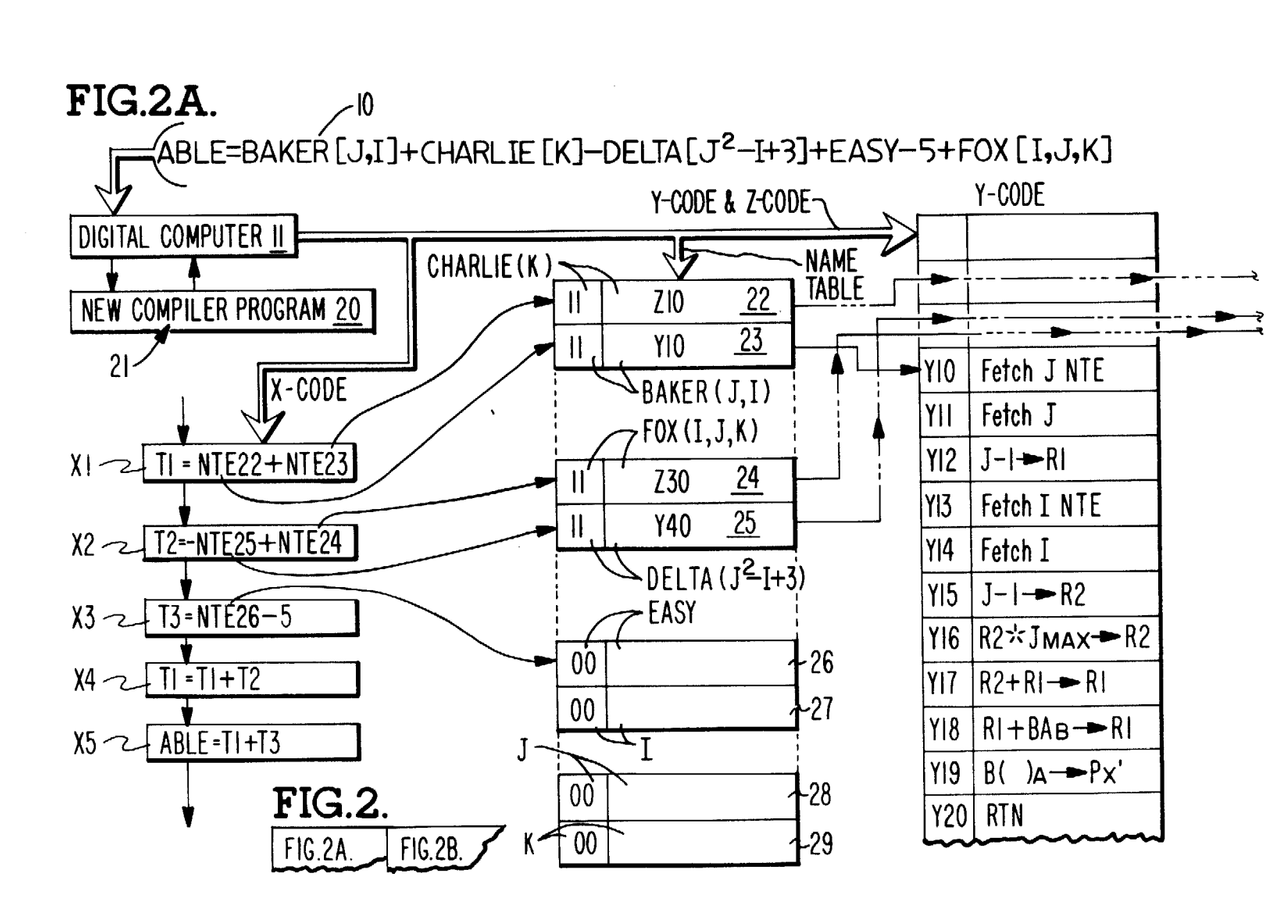
FIG. 2 is a diagram illustrating the transformation of a high level language source statement into multiple sets of relatively low level object language instructions as such transformation is carried out according to the present invention.
Figure 2B:
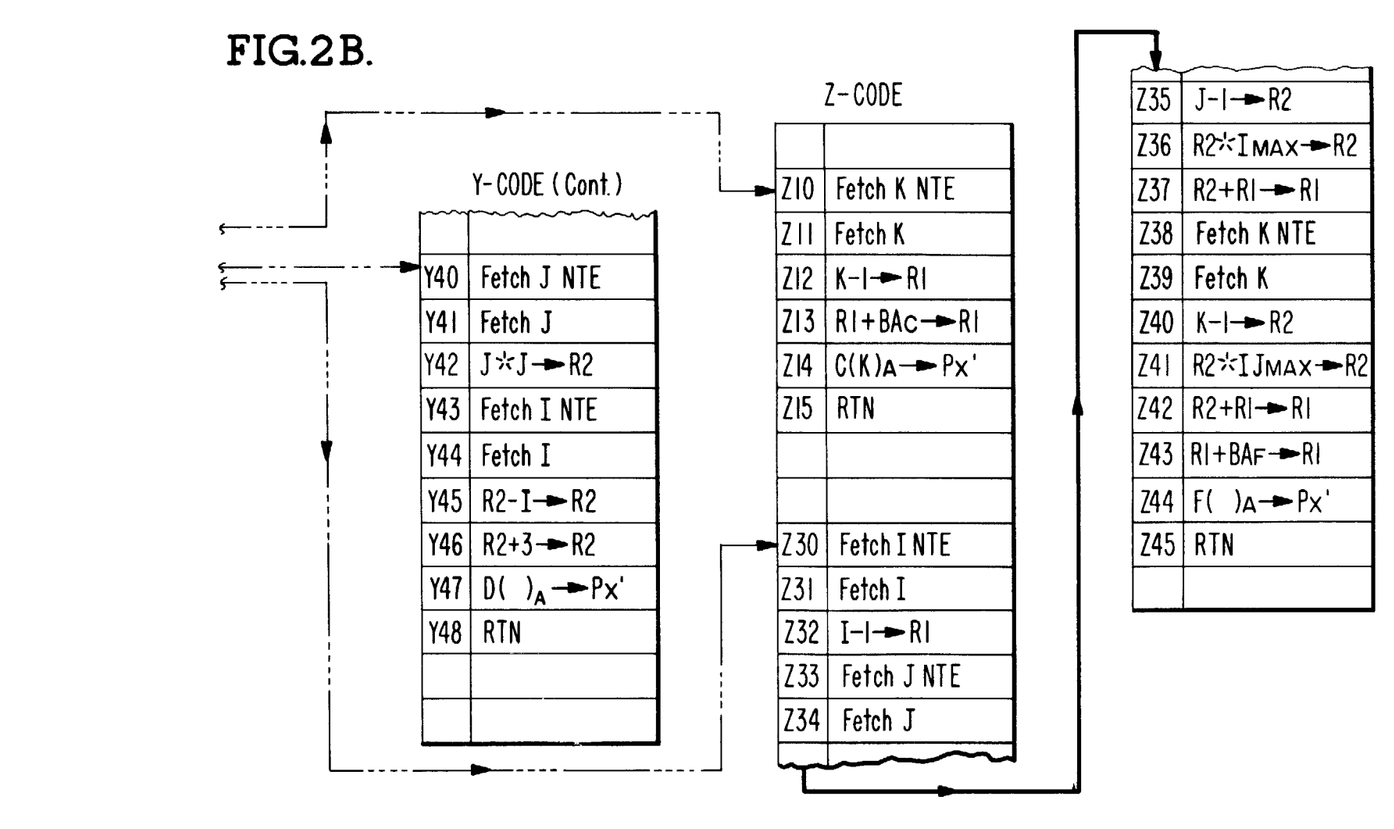

For example, in the NAME TABLE of FIG. 2, entry 22 corresponds to the variable CHARLIE(K). Entry 22 has a code of 11 and an address of Z10. This indicates that address Z10 is the beginning address of a set of instructions which compute the address of the variable CHARLIE(K). By comparison, entry 26 corresponds to the variable EASY; and it has a code of 00 and an address of Y15. This indicates that address Y15 is the address of the variable EASY.

Preferably, a code of 11 is assigned to a NAME TABLE ENTRY if the variable corresponding to that entry is indexed. Thus, entries 22, 23, 24, and 25 all have codes of 11 since the corresponding variables of CHARLIE, BAKER, FOX, and DELTA are all indexed. By comparison, the code of 00 preferably is assigned to an entry in the NAME TABLE if the corresponding variable is non-indexed. Thus, entries 26, 27, 28, and 29 all have codes of 00 since the corresponding variables of EASY, I, J, and K are all non-indexed.

As another step of compilation process, compiler 21 directs computer 11 to generate the Y-CODE and Z-CODE instructions. One set of these instructions is generated for each entry in the NAME TABLE having a code of 11. These instructions are stored in respective memories at the addresses given in the NAME TABLE and they compute the address of the corresponding variables.

For example, entry 22 in the NAME TABLE has a code of 11. Also, that entry corresponds to the variable CHARLIE(K) and it has an address of Z10. So compiler 21 directs computer 11 to generate object code instructions for storage in memory Z beginning at address 10 which instructions compute the address of the variable CHARLIE(K).

Similarly, entry 23 in the NAME TABLE has an 11 code, and corresponds to the variable BAKER(J,I). Also, it has an address Y15, so compiler 21 directs computer 11 to generate instructions in memory Y beginning at address 10 which instructions compute the address of the variable BAKER(J,I). In like manner, compiler 21 directs computer 11 to generate instructions in memory Z beginning at address 30 which compute the address of the variable FOX(I,J,K); and it directs computer 11 to generate instructions beginning at address 40 in memory Y which compute the address of the variable DELTA($J^2 - I + 3$).

As part of each X-CODE and Y-CODE instruction set, the compiler generates a pair of instructions which sends the computed address to a processor $P_X$ and then returns control back to a predetermined state. This pair of instructions is located at the end of the instruction set. For example, in the instruction set beginning at address 10 in memory Y, this pair of instructions is identified as I19 and I20.

As still another step of the compilation process, compiler 21 directs computer 11 to generate the X-CODE instructions. During this step, instructions are generated which combine pairs of variables that occur in the assignment statement that is being compiled and which store the result in a temporary location. After all of the pairs of variables have been combined, other X-CODE instructions are generated which combine pairs of the intermediate results in the manner specified by the assignment statement. By such pair-combining steps, the end result is reached; and it is stored at the address of the variable that is being assigned a new value.

For example, in FIG. 2, instruction X1 combines the variables BAKER and CHARLIE and stores the result in a temporary location T1; instruction X2 combines the variables DELTA and FOX and stores the result in a temporary location T2; and instruction X3 combines the remaining variable EASY with the constant "5" and stores the result in a temporary location X3. Thereafter, the intermediate results at locations T1, T2, and T3 are combined in pairs by instructions X4 and X5 to reach the end result; and it is stored at the address of the variable ABLE.

Those X-CODE instructions which combine pairs of variables identify the variables that are being combined by referencing appropriate entries in the NAME TABLE. For example, instruction X1 combines the variables BAKER and CHARLIE; and so it references NAME TABLE ENTRIES 22 and 23. Similarly, instruction X2 combines the variables DELTA and FOX; so it references NAME TABLE ENTRIES 24 and 25. Likewise, instruction X3 combines the variable EASY with a constant; and so it references NAME TABLE ENTRY 26.

Preferably, X-CODE instructions are generated such that, whenever it is possible, they combine pairs of variables that are indexed. For example, in assignment statement 10 there are a total of four indexed variables, one pair of which is combined by instruction X1 and the other pair of which is combined by instruction X2. Also, the pair of indexed variables referenced in instruction X2 is combined even though they are separated in statement 10 by the non-indexed variable EASY and the constant "5".

From the above, it is apparent that every X-CODE instruction has a very regular format in which two items are combined and stored as another item, and in which each item may be a reference to a NAME TABLE ENTRY or a TEMPORARY LOCATION or a CONSTANT. Suitably, the nature of a particular item is indicated in the X-CODE instruction by concatinating identifier bits to the item. Also suitably, an item in an X-CODE instruction that references a NAME TABLE ENTRY does so by including the location of the desired entry as part of that item.

Figures 3, 3A:
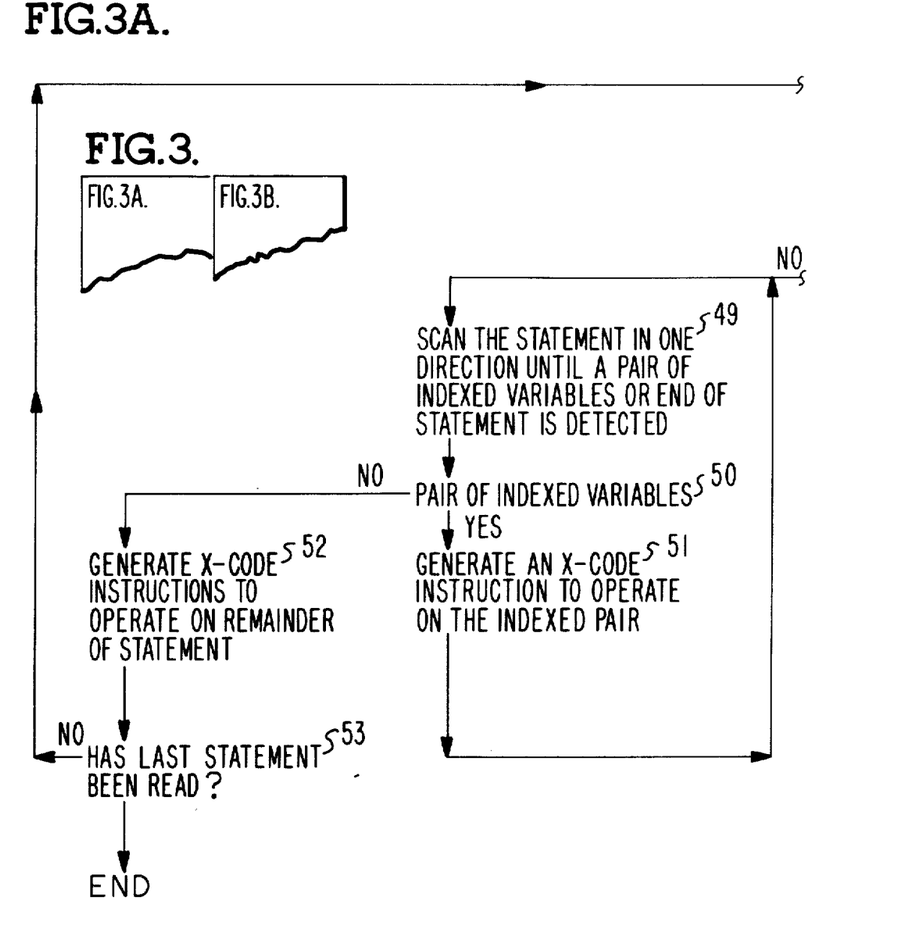
FIG. 3 is a flow chart illustrating the major steps of the language transformation process of FIG. 2.
Figure 3B:
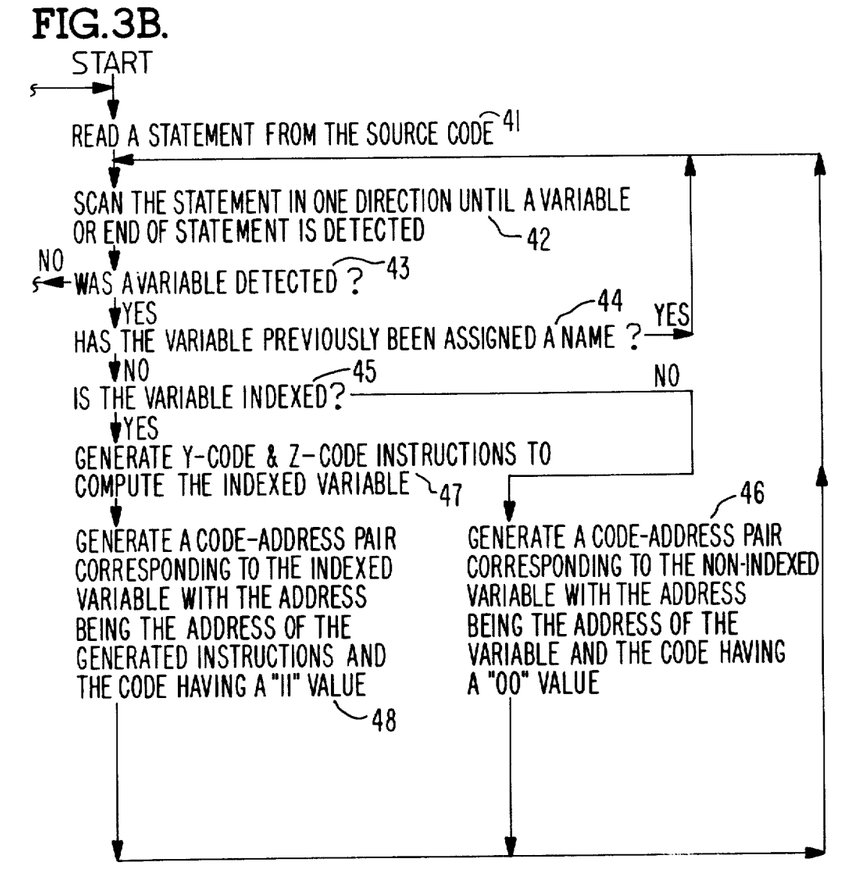

All of the above-described steps and the sequence in which they are carried out by compiler 13 are illustrated in greater detail in the flow chart of FIG. 3. As a first step, compiler 13 directs computer 11 to read a statement from the source code. This step is indicated by reference numeral 41. Thereafter, the compiler directs computer 11 to scan the statement that was read until either a variable or the end of the statement is detected. This step is indicated by reference rumeral 42.

If a variable is detected, compiler 13 directs computer 11 to scan the NAME TABLE to determine if that same variable had previously been assigned an entry. If an entry already exists, compiler 13 directs computer 11 to continue scanning the statement for another variable. These steps are indicated by reference numerals 43 and 44.

On the other hand, if the variable has no entry in the NAME TABLE, compiler 13 directs computer 11 to generate an entry. As part of this process, compiler 13 directs computer 11 to determine whether or not the variable is indexed. If the variable is not indexed, then compiler 13 directs computer 11 to generate a code-address pair in which the address is of the variable itself and the code has a value of 00. This step is indicated by reference numerals 45 and 46.

If, however, the variable is indexed, compiler 13 directs computer 11 to generate Y-CODE or Z-CODE instructions which when executed compute the address of the indexed variable. Also, compiler 13 directs computer 11 to generate a code-address pair in which the address is of the beginning of the Y-CODE or Z-CODE instructions, and the code has a value of 11. This step is indicated by reference numerals 47 and 48.

All of the above steps are repeated in an iterative fashion until the end of the statement being processed is detected. When that occurs, compiler 13 directs computer 11 to re-scan the statement and detect a pair of indexed variables. This step is indicated by reference numeral 49.

When a pair of indexed variables is detected, compiler 13 directs computer 11 to generate an X-CODE instruction which combines those variables in the manner prescribed by the assignment statement and temporarily store the results. Thereafter, computer 11 continues to scan the statement until either another pair of indexed variables is detected (in which case another X-CODE instruction is generated which combines that pair of indexed variables), or until the end of the statement is detected. These steps are indicated by reference numerals 50 and 51.

After the end of the statement is detected, compiler 13 directs computer 11 to generate X-CODE instructions which combine any temporarily stored results with any non-indexed variables and constants in the statement. This combining is performed on two items at a time so that the format of each X-CODE instruction remains regular. Then the last X-CODE instruction stores the end result at the address of the variable that is being assigned a new value. This step is indicated by reference numeral 52.

Thereafter, compiler 13 directs computer 11 to determine if there are any other statements remaining to be processed in the high level source language. If another statement remains, the entire sequence is repeated; otherwise, the compilation process ends. This step is indicated by reference numeral 53.

A computer listing of a compiler for performing the above-described steps is included herein as Appendix 1. This compiler is written in a quasi-Algol language; and it would be stored in a machine-readable fashion in a memory 20, such as a magnetic disk, from which it would be read into computer 11 as needed. Suitable methods for recording the compiler in the memory 20 are described in U.S. Pat. Nos. 3,108,261 and 4,007,335 and 4,234,897.

Figure 4:
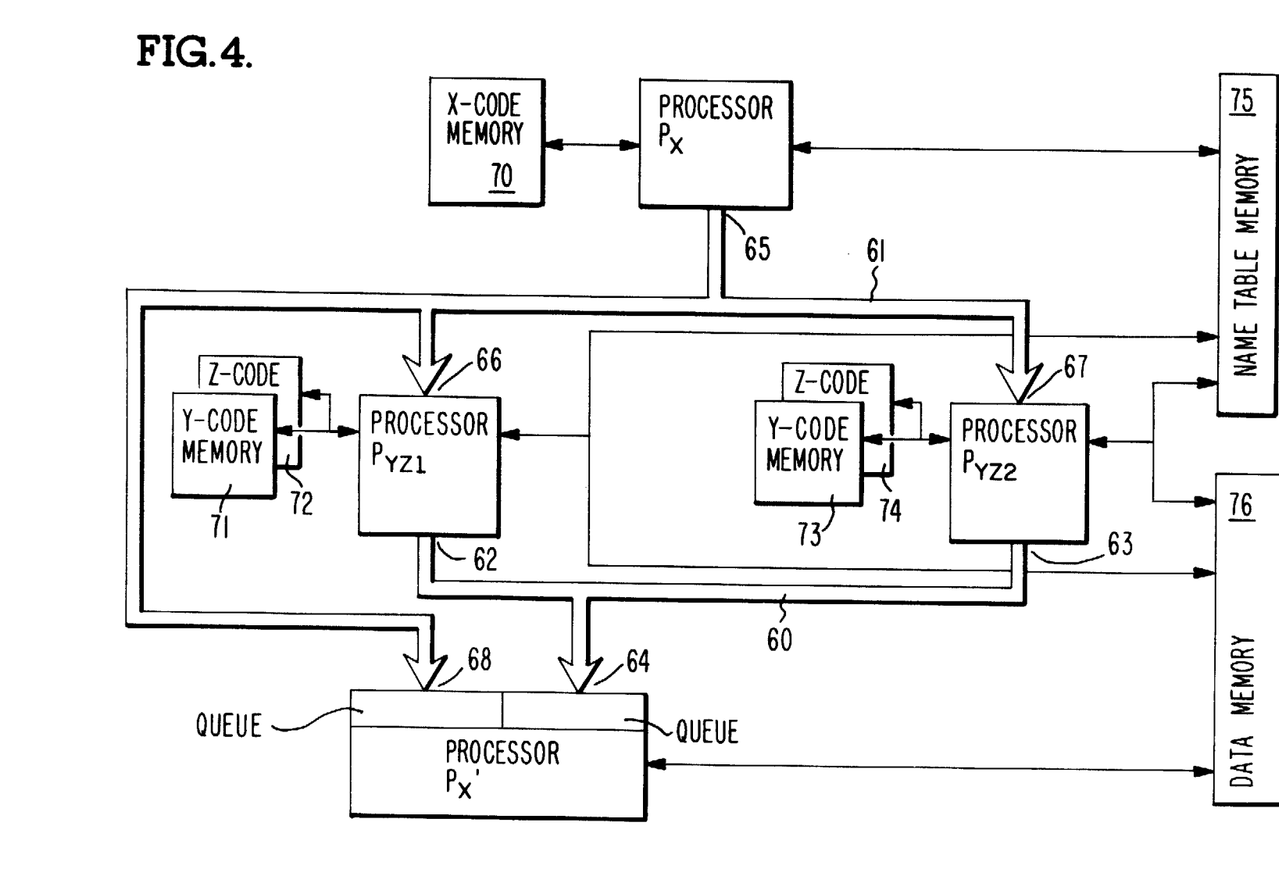
FIG. 4 illustrates a digital computer system constructed according to the invention for executing, in an inteleaved-parallel fashion, the multiple low level language instruction sets that are generated by the process of FIG. 2.

Referring now to FIG. 4, one preferred embodiment of a computer system for executing the compiled low level X-CODE, Y-CODE, and Z-CODE instructions will be described. Included in this computer are four processors $P_X$, $P_{YZ1}$, $P_{YZ2}$, and $P_{X'}$, all of which are intercoupled as a system via a pair of buses 60 and 61. Specifically, bus 60 intercouples respective output ports 62 and 63 on processors $P_{YZ1}$ and $P_{YZ2}$ to an input port 64 on processor $P_{X'}$; while bus 61 intercouples an output port 65 on processor $P_X$ to respective input ports 66, 67, and 68 on processors $P_{YZ1}$, $P_{YZ2}$, and $P_{X'}$. Preferably, input ports 64 and 68 each include a queue for buffering several messages from the buses 60 and 61.

Memories 70–76 are also included in the digital computer of FIG. 4. Memory 70 contains the X-CODE instructions and is coupled to processor $P_X$. Memories 71 and 72 respectively contain the Y-CODE and Z-CODE instructions and they are coupled to processor $P_{YZ1}$. Similarly, memories 73 and 74 respectively contain the Y-CODE and Z-CODE instructions and are coupled to processor $P_{YZ2}$.

Memory 75 contains the NAME TABLE and is coupled via respective buses to processors $P_X$, $P_{YZ1}$ and $P_{YZ2}$. And lastly, memory 76 contains data and is coupled via respective buses to processors $P_{YZ1}$, $P_{YZ2}$, and $P_{X'}$. All of the above-mentioned buses between the memories 70-76 and the processors are illustrated in FIG. 4 merely as arrowed lines.

Suitably, each of the processors $P_X$, $P_{YZ1}$, $P_{YZ2}$, and $P_{X'}$ is of the type described in U.S. Pat. No. 4,327,355 entitled "Digital Device with Interconnect Matrix", or are of the type described in co-pending application Ser. No. 087,666 entitled "Digital Computer Having Programmable Structure" filed Oct. 24, 1979, both of which are assigned to the assignee of the present application. Also suitably, each of the memories 70-77 is of the type described in U.S. Pat. No. 4,262,298 entitled "RAM Having a Stabilized Substrate Bias and Low Threshold Narrow-Width Transfer Gate" which again is assigned to the assignee of the present application.

Processors $P_X$ and $P_{X'}$ operate during respective spaced-apart time intervals to share in the execution of each X-CODE instruction. By comparison, processors $P_{YZ1}$ and $P_{YZ2}$ operate in parallel between the time intervals in which processors $P_X$ and $P_{X'}$ operate, and they execute respective Y-CODE and Z-CODE instructions. This operation will now be described in greater detail in conjunction with FIGS. 5A and 5B.

Figures 5, 5A:
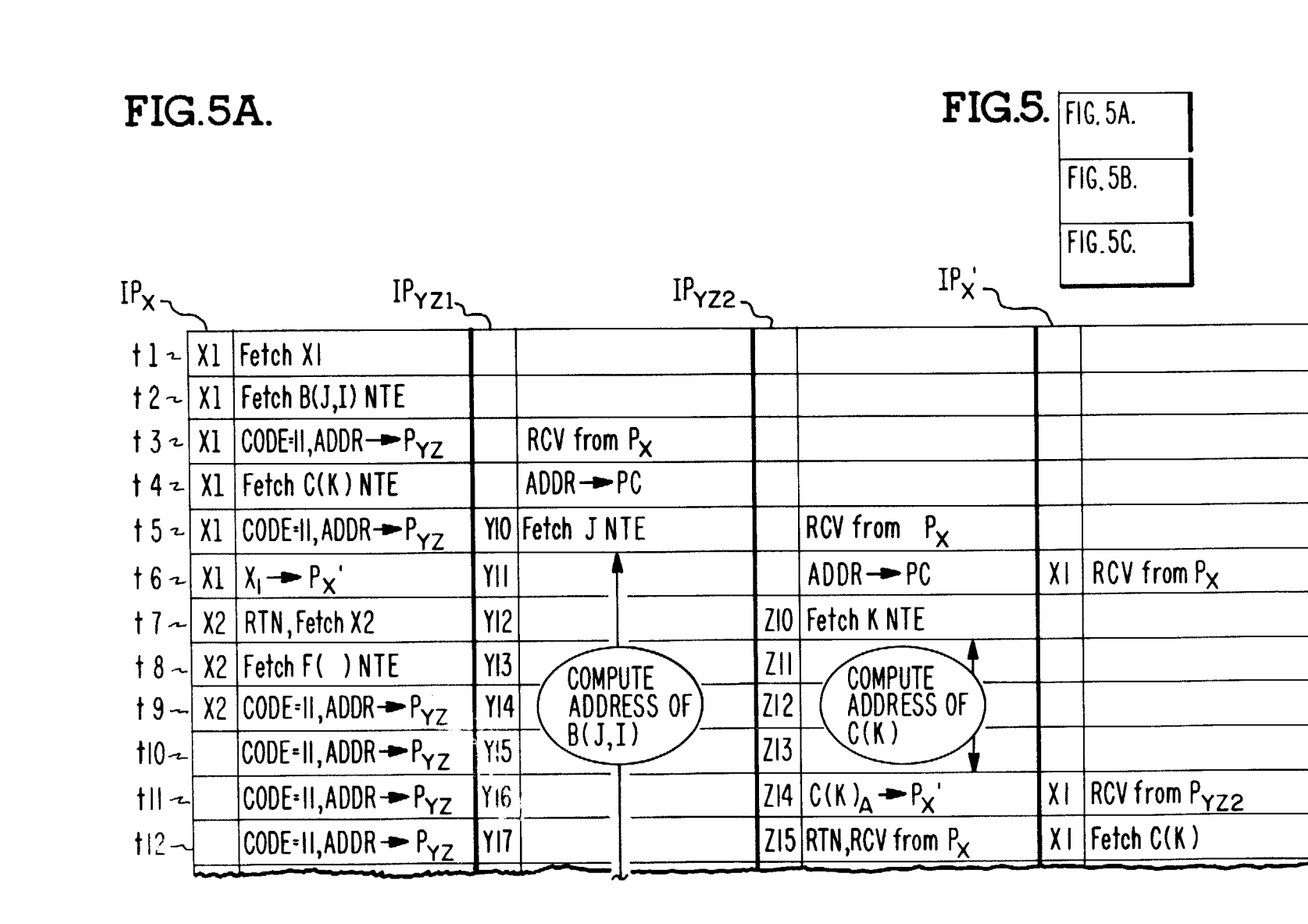
FIGS. 5A, 5B and 5C are diagrams illustrating the sequence by which each of the processors in the system of FIG. 4 executes the various instructions in the multiple instruction sets that are generated by the FIG. 2 process.
Figure 5B:
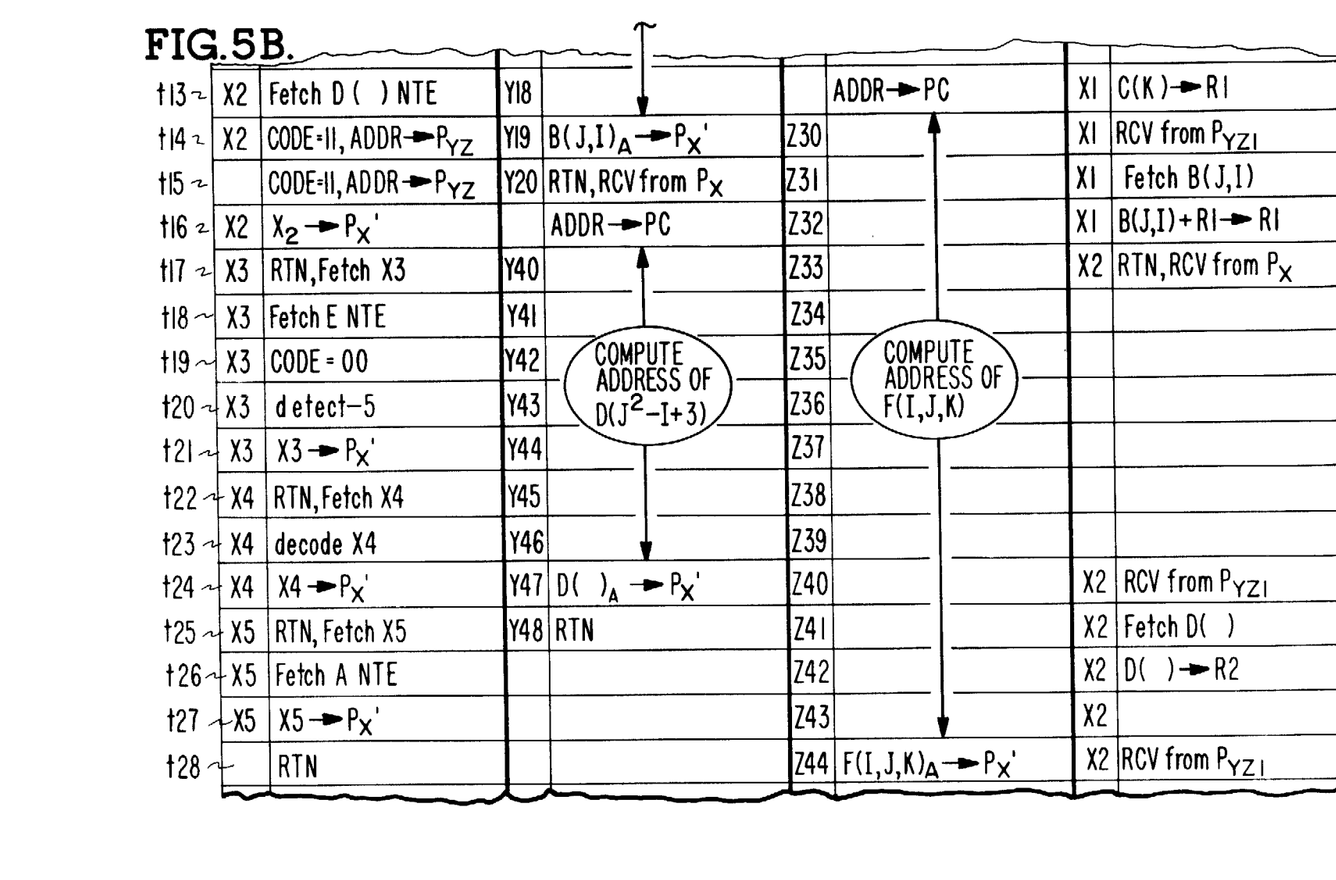

FIGS. 5A and 5B are in the form of a chart having several rows and columns. The rows represent respective time intervals and are labeled t1, t2, ... t40. Also, four of the columns, which are labeled $IP_X$, $IP_{YZ1}$, $IP_{YZ2}$, and $IP_{X'}$, indicate the low level language instructions that are respectively executed by processors $P_X$, $P_{YZ1}$, $P_{YZ2}$, and $P_X$, during the various time intervals. Lying adjacent to those columns are four other columns which indicate how the low level language instructions are executed.

In FIGS. 5A and 5B, the X-CODE, Y-CODE, and Z-CODE instructions that are listed are those which were generated during the compilation process of statement 10 in FIG. 2. Inspection of FIGS. 5A and 5B shows that processor $P_X$ executes a portion of the compiled instruction X1 during time intervals t1-t6 while processor $P_{X'}$ executes the remaining portion of that same instruction during time intervals t11-t16.

Meanwhile, between the time intervals that processors $P_X$ and $P_{X'}$ are operating on the X1 instruction, processors $P_{YZ1}$ and $P_{YZ2}$ are executing respective sets of Y-CODE and Z-CODE instructions. Specifically, processor $P_{YZ1}$ executes instructions Y10-Y20 during time intervals t5-t15 while processor $P_{YZ2}$ executes instructions Z10-Z15 during time intervals t7-t12.

Similarly, processor $P_X$ executes a portion of instruction X2 during time intervals t7-t16; while processor $P_{X'}$ executes the remaining portion of that instruction during time intervals t24-t30. And between the time intervals that processors $P_X$ and $P_{X'}$ operate on instruction X2, processors $P_{YZ1}$ and $P_{YZ2}$ simultaneously execute separate Y-CODE and Z-CODE instructions. Specifically, processor $P_{YZ1}$ executes instructions Y40-Y48 during time intervals t17 and t25; while processor $P_{YZ2}$ executes instructions Z30-Z45 during time intervals t14-t29.

Consider now in greater detail the sequence by which processors $P_X$, $P_{YZ1}$, $P_{YZ2}$, and $P_{X'}$ execute the X-CODE, Y-CODE, and Z-CODE instructions. To begin, during time interval t1, processor $P_X$ fetches instruction X1. Next, during time interval t2, processor $P_X$ fetches the NAME TABLE ENTRY of the indexed variable B(J,I) that is referenced in instruction X1. Thereafter, during time interval t3, processor $P_X$ determines that the NAME TABLE ENTRY for variable B(J,I) has a code of 11; and so processor $P_X$ sends the corresponding NAME TABLE ENTRY address over bus 60 to processor $P_{YZ1}$.

During time interval t4, processor $P_{YZ1}$ receives the address sent by processor $P_X$; and during time interval t5, that address is loaded into a program counter. That address is of instruction Y10; and so, processor $P_{YZ1}$ executes instruction Y10 during the next time interval t5. Thereafter, processor $P_{YZ1}$ sequentially executes instructions Y11 through Y18 during time intervals t6-t13 to compute the address of the indexed variable B(J,I).

During the following time interval of t14, processor $P_{YZ1}$ sends the address of the variable B(J,I) to processor $P_{X'}$. Then, during time interval t15, processor $P_{YZ1}$ returns to a state where it is ready to receive another address from processor $P_X$.

Meanwhile, back during time interval t4, processor $P_X$ continues to execute instruction X1 by fetching the NAME TABLE ENTRY of variable C(K). Then, during time interval t5, processor $P_X$ determines that the NAME TABLE ENTRY has the code of 11; and so it sends the corresponding NAME TABLE ENTRY address over bus 60 to processor $P_{YZ2}$.

That address is received by processor $P_{YZ2}$ during time interval t5; and it is loaded into the processor's program counter during time interval t6. Then, during the next time interval of t7, processor $P_{YZ2}$ executes the addressed instruction, which is instruction Z10.

Thereafter, during time intervals t8-t10, processor $P_{YZ2}$ sequentially executes instructions Z11-Z13 to compute the address of the indexed variable C(K). Then, during time interval t11, processor $P_{YZ2}$ sends the address of variable C(K) to processor $P_{X'}$; and during time interval t12 it returns to a state where it is ready to receive another address from processor $P_X$.

Meanwhile, back during time interval t5, processor $P_X$ completed its operations on instruction X1. So, during the next time interval t6, processor $P_X$ transfers instruction X1 via bus 60 to processor $P_{X'}$. Thereafter, during time interval t7, processor $P_X$ returns to a state where it begins execution of the next X-CODE instruction.

Processor $P_{X'}$ receives instruction X1 from processor $P_X$ during time interval t6. But, processor $P_{X'}$ does not begin execution of instruction X1 until it receives an address from one of the processors $P_{YZ1}$ or $P_{YZ2}$. That occurs during time interval t11 in which processor $P_{X'}$ receives the address of the variable C(K) from processor $P_{YZ2}$.

During the following time interval t12, processor $P_{X'}$ fetches the variable C(K) from the data memory 77; and during time interval t13 it stores the result in a temporary register R1. Then during time interval t14, processor $P_{X'}$ receives the address of the variable B(J,I) from processor $P_{YZ1}$.

In time interval t15, processor $P_{X'}$ fetches the variable B(J,I). Then, in the next time interval t16, processor $P_{X'}$ receives the variable B(J,I), adds it to the variable C(K), and stores the result in register R1. This addition operation is specified by the X1 instruction that was previously received by processor $P_{X'}$ from processor $P_X$ during time interval t6.

The addition operation by processor $P_{X'}$ completes the execution of instruction X1. Consequently, during the next time interval of t17, processor $P_{X'}$ returns to a state where it is ready to receive another X-CODE instruction from processor $P_X$.

Meanwhile, back during time interval t7, processor $P_X$ fetches the next X-CODE instruction which is instruction X2. Then, during time interval t8, processor $P_X$ fetches the NAME TABLE ENTRY of the variable FOX(I,J,K). Then in time interval t9, processor $P_X$ examines the NAME TABLE ENTRY that it fetched, determines that it has a 11 code, and attempts to send the address portion of the NAME TABLE ENTRY to one of the processors $P_{YZ1}$ or $P_{YZ2}$.

However, since both processors $P_{YZ1}$ and $P_{YZ2}$ are already busy computing respective addresses during time interval t9, they are not free to receive the address from processor $P_X$. Thus, processor $P_X$ retries during the subsequent time intervals to send the address. And, during time interval t12, processor $P_{YZ2}$ completes its calculation of the address of variable C(K); and so it receives the NAME TABLE ENTRY address from processor $P_X$. Thereafter, during time interval t13, processor $P_{YZ2}$ branches to the Z-CODE instructions that compute the address of the variable FOX(I,J,K). Processor $P_{YZ2}$ executes these instructions during time intervals t14-t27. Then, during time interval t28, processor $P_{YZ2}$ sends the computed address to processor $P_{X'}$; and during time interval t29, processor $P_{YZ2}$ returns to a state where it is ready to begin execution of another Y-CODE or Z-CODE instruction set.

Meanwhile, back during time interval t13, processor $P_X$ continues the execution of instruction X2 by fetching the NAME TABLE ENTRY of the variable $D(I^2-J+3)$. Thereafter, during time interval t14, processor $P_X$ determines that the fetched NAME TABLE ENTRY has an 11 code, and so it attempts to send the NAME TABLE ENTRY address to one of the processors $P_{YZ1}$ or $P_{YZ2}$.

Neither of the processors $P_{YZ1}$ or $P_{YZ2}$ are free to accept the NAME TABLE ENTRY address from processor $P_X$ during time interval t14; so, processor $P_X$ retries the sending of the NAME TABLE ENTRY address during time interval t15. Then during time intervals t16, processor $P_X$ sends instruction X2 to processor $P_{X'}$; and during time interval t17, processor $P_X$ returns to a state where it begins execution of another X-CODE instruction.

But, during time interval t16, processor $P_{YZ1}$ branches to the Y-CODE instructions at the address that it received from processor $P_X$. Thereafter, during time intervals t17-t23, processor $P_{YZ1}$ executes the Y-CODE instructions which compute the address of the variable $D(J^2-I+3)$. Then, during the next two time intervals, processor $P_{YZ1}$ sends the computed address to processor $P_{X'}$ and returns to a state where it is ready to receive another address from processor $P_X$.

Meanwhile, during time interval t17, processor $P_{X'}$ is ready to begin execution of the X2 instruction that it previously received from processor $P_X$. So, processor $P_{X'}$ waits until it receives an address of a variable that is operated or in instruction X2. One of those addresses is sent by processor $P_{YZ1}$ during time interval t24; and the other address is sent by processor $P_{YZ2}$ during time interval t28. These addresses are then utilized by processor $P_{X'}$ during time intervals t25-t30 to fetch the addressed variables and perform an operation on them as indicated in the X2 instruction.

Back during time interval t17, processor $P_X$ begins execution of instruction X3 by fetching that instruction. Then, during time interval t18, processor $P_X$ fetches the NAME TABLE ENTRY for the variable EASY; and during the next time interval, processor $P_X$ determines that the variable EASY is not indexed since the code in the NAME TABLE ENTRY is 00.

Thereafter, during time interval t20, processor $P_X$ examines the second item in instruction X3 and determines that it is a constant. So, during the next time interval of t21, processor $P_X$ finishes its operations on instruction X3 by sending it along with the address of the variable EASY to processor $P_{X'}$.

Next, during time interval t22, processor $P_X$ begins execution of instruction X4. In time interval t23, processor $P_X$ decodes instruction to determine that neither of the items T1 or T2 in that instruction require a fetch from the NAME TABLE. So, during time interval t24, processor $P_X$ sends instruction X4 to processor $P_{X'}$.

Then during time interval t25, processor $P_X$ begins execution of instruction X5. This execution involves a fetch of the NAME TABLE ENTRY for the variable ABLE, which occurs during time interval t26. And during time interval t27, processor $P_X$ completes its execution of instruction X5 by sending that instruction along with the NAME TABLE ENTRY of the variable ABLE to processor $P_{X'}$.

Figure 5C:
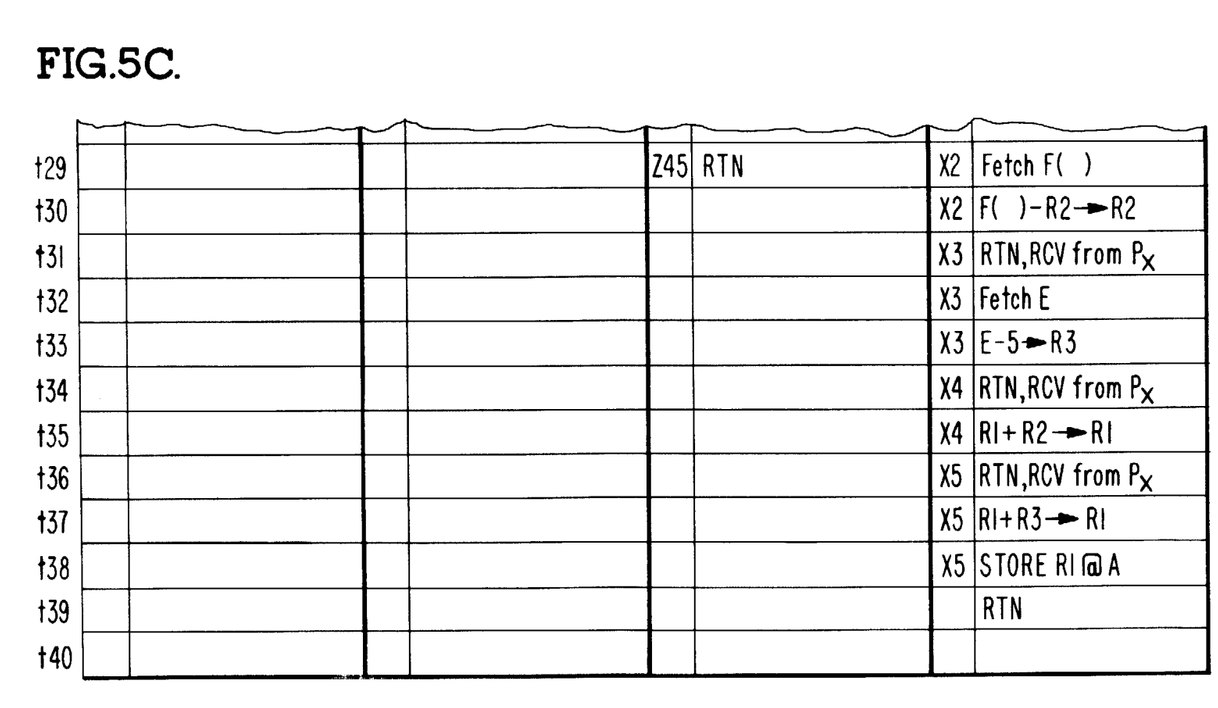

Meanwhile, during time interval t31, processor $P_{X'}$ begins execution of instruction X5. This execution consists of the fetching of the variable EASY during time interval t32 and adding of that variable to the constant $-5$ during time interval t33.

Next, during time interval t34, processor $P_{X'}$ begins execution of instruction X4. This execution involves the adding of two previously calculated intermediate results that were stored in registers R1 and R2.

Thereafter, during time interval t36, processor $P_{X'}$ begins execution of instruction X5. This execution involves combining the intermediate results in registers R1 and R3 and storing that final result in data memory 77 at the address corresponding to the variable ABLE.

As a variation of the above sequence, suppose that the constant instead was an indexed variable, and had a code in the NAME TABLE ENTRY of 11. In that case, processor $P_X$ would transfer the address in the NAME TABLE ENTRY to one of the processors $P_{YZ1}$ or $P_{YZ2}$ which in turn would compute the address of the indexed variable as described above with respect to the other indexed variables.

From the above description, it should be apparent that the data processing system of FIG. 4 executes the object code of FIG. 2 substantially faster than the corresponding object code of FIG. 1 could be executed. This is because the processing system of FIG. 4 executes the Y-CODE and Z-CODE instructions in parallel while at the same time interleaving the execution of the X-CODE instructions.

Inspection of FIG. 5 shows that processor $P_X$ executes the object code of FIG. 2 during time intervals t1-t27. This is a total of 27 time intervals; whereas by comparison, the corresponding object code of FIG. 1 requires a total of 47 time intervals for its execution. Thus, by this comparison, an improvement of $(47-27) \div 27$ is obtained, which is an improvement of 74 percent.

As another measure of the improvement, inspection of FIG. 5 shows that processor $P_X$ executes the object code of FIG. 2 during time intervals t11-t38. This is a total of 28 time intervals. So, by this comparison, an improvement of $(47-28) \div 28$ is obtained, which is an improvement of 69 percent.

Various preferred embodiments of the invention have now been described in detail. However, many modifications and changes can be made to these details without departing from the nature and spirit of the invention. Accordingly, it is to be understood that the invention is not limited to said details but is defined by the appended claims.

APPENDIX 1

```
#FILE (MTSXXX)COMPILER ON ENGPK
ZZZZZZZZZZZZZZZZZZZZZZZZZZZZZZZZZZZZZZZZZZZZZZZZZZZZZZZZZZZZZZZZ
procedure emit_x_code(opcode, source1, source2, dest);
%
%   This procedure generates the outputs the object code
%
ZZZZZZZZZZZZZZZZZZZZZZZZZZZZZZZZZZZZZZZZZZZZZZZZZZZZZZZZZZZZZZZZ
begin
    .
    .
    .
end;

ZZZZZZZZZZZZZZZZZZZZZZZZZZZZZZZZZZZZZZZZZZZZZZZZZZZZZZZZZZZZZZZZ
procedure generate_x_code(op, operand,
                          old_op, old_operand, temp_op);
%
%   This procedure generates X code for either a pair of variables or
%   a pair of array elements as determined by the parameters with
%   which it is called. Additionally, code to operate on prevoiusly
%   generated temporary results may be generated.
%
ZZZZZZZZZZZZZZZZZZZZZZZZZZZZZZZZZZZZZZZZZZZZZZZZZZZZZZZZZZZZZZZZ
begin if old_op = empty then            % the first operand of a pair
       begin                           % has just been encountered
         old_op := op;
         old_operand := operand;
       end
    else
    if temp_op = empty then           % a pair has been found, and no
       begin                           % temporary results have been made
         if old_op = op then
            emit_x_code("add", old_operand, operand, temp1)
         else
            emit_x_code("subtract", old_operand, operand, temp1);
         temp_op := op;
         old_op := empty;
       end
    else begin    % there is a pair, and a previously generated temporary
         if old_op = op then
            emit_x_code("add", old_operand, operand, temp2)
         else
            emit_x_code("subtract", old_operand, operand, temp2);
         if temp_op = op then
            emit_x_code("add", temp1, temp2, temp1)
         else
            emit_x_code("subtract", temp1, temp2, temp1);
         temp_op := op;
         old_op := empty;
       end;
end generate_x_code;

repeat
      begin
        read(input, input data);
```

APPENDIX 1 (cont'd)

```
if not eof(input) then
  begin
  initialize_scanner(input_data),
  scan_next_token;
  while token <> end_of_statement do
      begin
      if identifier(token) then
          begin
          if not present_in_symbol_table(token) then
             begin
             ste := new_symbol_table_entry;
             id(ste) := token;
             nte := new_name_table_entry;
             name(ste) := nte;
             scan_next_token;
             if token = "(" then
                begin
                scan_next_token;
                type(ste) := array;
                code(nte) := "11";
                address(nte) := generate_y_and_z_code;
                if token <> ")" then
                    error;
                scan_next_token;
                end
             else begin
                type(ste) := simple_variable;
                code(nte) := "00";
                address(nte) := assign_address_for_variable;
                end;
             end
          else begin
             ste := symbol_table_lookup(token);
             if type(ste) = array then
                begin
                scan_next_token;
                if token <> "(" then
                   error
                else begin
                   scan_next_token,
                   nte := new_name_table_entry,
                   code(nte) := "11";
                   address(nte) := generate_y_and_z_code;
                   compare_array_ntes(ste, nte),
                   if token <> ")" then
                       error,
                   scan_next_token;
                   end;
                end;
             end;
          end
      else begin
          scan_next_token,
          end;
      end,
  initialize_scanner(input_data);
  scan_next_token,
  if not identifier(token) then
      error
  else begin
      ste := symbol_table_lookup(token);
      if type(ste) = array then
         begin
         scan_next_token;
         if token <> "(" then
             error;
         dest_name := find_name;
```

APPENDIX 1 (cont'd)

```
            if token <> ")" then
                error;
            end.
        else
            dest_name := name(dest);
        scan next token;
        if token <> "=" then
            error;
        if operator(token) then
            begin
            op := token;
            scan_next_token,
            end
        else
            op := "+";
        array_op := empty;
        var_op := empty;
        temp_op := empty;
        repeat
            begin
            if identifier(token) then
                begin
                ste := symbol_table_lookup(token);
                if type(ste) = array then
                    begin
                    scan_next_token,
                    if token <> "(" then
                        error;
                    operand_name := find_name;
                    if token <> ")" then
                        error;
                    generate_x_code(op, operand,
                            array_op, array_operand, temp_op),
                    end
                else
                if type(ste) = variable then
                    begin
                    operand := name(ste),
                    scan_next_token,
                    generate_x_code(op, operand,
                            var_op, var_operand, temp_op);
                    end;
                end
            else
            if number(token) then
                begin
                operand := value(token),
                scan_next_token;
                generate_x_code(op, operand,
                        var_op, var_operand, temp_op);
                end
            else
                error,
            if operator(token) then
                begin
                op := token;
                scan_next_token,
                if token = end_of_statement then
                    error,
                end,
            end
        until token = end_of_statement,
        end,
    end;
    end
until eof(input),
end.
```

What is claimed is:

1. In a digital computer, a method of transforming a relatively high level source language statement into first, second, and third sets of relatively low level object language instructions such that instructions of said first set are executable in an interleaved fashion with instructions of said second and third sets both of which are executable at the same time, said method including the steps of:
   generating, via said computer, an instruction of said first set which specifies a mathematical operation in said statement and references two encoded addresses having the same code indicating that the respective addresses are of instructions in said second and third sets; and
   producing, via said computer, said instructions of said second and third sets for respective storage at said encoded addresses which are simultaneously executable to compute respective addresses for two variables in said statement that are modified by said mathematical operation.

2. A method according to claim 1 wherein said generating and producing steps are repeatedly performed via said computer for each pair of indexed variables in said source language statement.

3. A method according to claim 1 wherein said generating and producing steps are performed via said computer for two indexed variables in said statement that are separated by a non-indexed variable.

4. A method according to claim 1 wherein said variables are selected from the forms of A(I) where A represents a list and A(I) represents the I-th item in said list, $A(I_1,I_2, \ldots I_N)$ where A represents an N-dimensional matrix and $A(I_1,I_2, \ldots I_N)$ represents a particular item in said matrix at indices $I_1$ through $I_N$, and A(f(I)) where A represents a set of indexed items and f(I) is an equation which identifies the I-th item in said set.

5. A method according to claim 1 and further including the step of generating via said computer an instruction of said first set which specifies a mathematical operation in said source language on a non-indexed variable and references an encoded address having a code different from said common code indicating the address is of said non-indexed variable.

6. A method according to claim 1 wherein said source language statement is selected from the group of FORTRAN, ALGOL, PASCAL, COBOL, C, PLI, and PL/M-80.

7. A method according to claim 1 wherein said source language statement is an assignment statement of the type which equates one variable to a mathematical function of other variables.

8. In a digital computer, a method of transforming a relatively high level source language statement into first and second sets of relatively low level object language instructions such that instructions of said first set are executable in an interleaved fashion with instructions of said second set, said method including the steps of:
   generating, via said computer, an instruction of said first set which specifies a mathematical operation in said statement and references an encoded address having a first code indicating that the address is of a first variable and references another encoded address having a second code indicating that the address is of instructions in said second set; and
   producing, via said computer, said instructions of said second set for storage at said second encoded address which computes the address of a second variable which is combined in said source language statement with said first variable by said mathematical operation.

9. A method according to claim 8 wherein said step of generating said instruction of said first set is performed via said computer such that said first code in said encoded address indicates the address is of a non-indexed variable, and said second code in said encoded address indicates the address is of instructions of said second set which compute the address of an indexed variable.

10. A method according to claim 8 wherein said variable at said address as computed by said second set of instructions is selected from the forms of A(I) where A represents a list and A(I) represents the I-th item in said list, $A(I_1,I_2, \ldots I_N)$ where A represents an N-dimensional matrix and $A(I_1,I_2, \ldots I_N)$ represents a particular item in said matrix at indices $I_1$ through $I_N$, and A(f(I)) where A represents a set of indexed items and f(I) is an equation which identifies the I-th item in said set.

11. A method according to claim 8 wherein said source language statement is selected from the group of FORTRAN, ALGOL, PASCAL, COBOL, C, PLI, and PL/-80.

12. A method according to claim 8 wherein said source language statement is an assignment statement of the type which equates one variable to a mathematical function of other variables.

13. For use in a computer-implemented process of transforming a relatively high level source language statement into first, second, and third sets of relatively low level object language instructions such that instructions of said first set are executable in an interleaved fashion with instructions of said second and third sets both of which are executable at the same time, a computer program encoded in a machine-readable fashion on a storage media comprising:
   means for generating signals which direct said computer to produce an instruction of said first set which specifies a mathematical operation in said statement and references two encoded addresses having the same code indicating the respective addresses are of instructions in said second and third sets; and
   means for generating signals which direct said computer to produce instructions of said second and third sets for respective storage at said encoded addresses which simultaneously compute respective addresses for two variables that are modified in said statement by said mathematical operation.

14. For use in a computer-implemented process of transforming a relatively high level source language statement into first and second sets of relatively low level object language instructions such that instructions of said first set are executable in an interleaved fashion with instructions of said second set, a computer program encoded in a machine-readable fashion on a storage media comprising:
   means for generating signals which direct said computer to produce an instruction of said first set which specifies a mathematical operation in said statement and references a first encoded address having a first code indicating the address is of a first variable and references another encoded address having a second code indicating the address is of instructions in said second set; and
   means for generating signals which direct said computer to produce instructions of said second set for storage at said second encoded address which compute the address of a second variable which is combined in said source language statement with said first variable by said mathematical operation.

* * * * *